(12) United States Patent
Corren

(10) Patent No.: US 7,789,629 B2
(45) Date of Patent: Sep. 7, 2010

(54) NON-FOULING KINETIC HYDRO POWER SYSTEM AXIAL-FLOW BLADE TIP TREATMENT

(75) Inventor: Dean Corren, Burlington, VT (US)

(73) Assignee: Verdant Power, Arlington, VA (US)

( * ) Notice: Subject to any disclaimer, the term of this patent is extended or adjusted under 35 U.S.C. 154(b) by 848 days.

(21) Appl. No.: 11/634,847

(22) Filed: Dec. 7, 2006

(65) Prior Publication Data

US 2008/0138206 A1   Jun. 12, 2008

(51) Int. Cl.
*B64C 11/18* (2006.01)
(52) U.S. Cl. .............................. 416/223 R; 416/DIG. 2
(58) Field of Classification Search ............. 416/223 R, 416/223 A, 244 B, 245 A, 228, 242, DIG. 2, 416/DIG. 5, DIG. 4
See application file for complete search history.

(56) References Cited

U.S. PATENT DOCUMENTS

| | | | |
|---|---|---|---|
| 3,066,742 A * | 12/1962 | Castles, Jr. .................. 416/240 |
| 4,613,279 A | 9/1986 | Corren et al. |
| 2004/0070210 A1 | 4/2004 | Johansen et al. |

* cited by examiner

*Primary Examiner*—Edward Look
*Assistant Examiner*—Dwayne J White
(74) *Attorney, Agent, or Firm*—Davidson Berquist Jackson & Gowdey LLP

(57) ABSTRACT

This relates to a modified turbine blade tip design using a fairing shaped design that increases the tip area efficiency of a kinetic hydropower turbine rotor blade while having a non-fouling characteristic and a tip design with the ability to shed weeds, debris, or other submerged materials that might have fouling potential.

24 Claims, 19 Drawing Sheets

US 7,789,629 B2

NON-FOULING KINETIC HYDRO POWER SYSTEM AXIAL-FLOW BLADE TIP TREATMENT

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

RELATED PATENTS AND PUBLICATIONS

Reference is made to U.S. Pat. No. 4,613,279, Corren et al. entitled "Kinetic Hydro Energy Conversion System," which issued on Sep. 23, 1986, and to United States Published Patent Application No. 2004/0070210, Johansen et al., entitled "Apparatus For Production Of Energy From Currents In Bodies Of Water, a Foundation and a Method For The Installation Of The Apparatus," published on Apr. 15, 2004.

The present application is related to co-pending U.S. Patent Applications (1) U.S. application Ser. No. 11/727,112, filed on Mar. 23, 2007, entitled "Cable Jacket Sealing, Pressuring, and Monitoring" (2) U.S. application Ser. No. 11/802,614, filed May 24, 2007, entitled "Remanent Voltage generator Tachometer and Control for induction Machine" (3) U.S. application Ser No. 11/889,251, filed Aug. 10, 2007, entitled "Triangular Hub" and (4) U.S. patent application Ser. No. 11/400,281, filed on Apr. 10, 2006, entitled "Kinetic Hydropower From Slow Moving Waters" now U.S. Pat. No. 7,456,514.

FIELD OF THE INVENTION

This relates to Kinetic Hydro Power (KHP) system turbines. In particular, this relates to an improved turbine blade design for use with KHP turbines.

BRIEF DESCRIPTION OF THE DRAWINGS

The following description, given with respect to the attached drawings, may be better understood with reference to the non-limiting examples set forth with the drawings which are as follows:

FIG. 10b is an enlarged, partial isometric "solid" view of an exemplary modified turbine blade with enlarged tip of FIG. 10a;

FIG. 12b is an enlarged partial isometric view of the exemplary modified turbine blade with enlarged tip of FIG. 12a;

FIG. 14a is an enlarged isometric comparison of an exemplary embodiment of a modified turbine blade with an enlarged tip to the prior art turbine blade of FIG. 4a;

FIG. 14b is an enlarged, partial isometric view of the exemplary modified swept turbine blade with enlarged tip of FIG. 14a;

FIG. 15b is a representation of the exemplary modified turbine blade with enlarged tip of FIG. 15a;

INTRODUCTION

Typical KHP systems have an underwater axial-flow turbine with an external rotor portion that rotates in response to water flowing past the turbine. Power is generated in KHP turbines by converting mechanical energy from flowing water into rotating mechanical energy and then into electrical energy.

Figure 1:
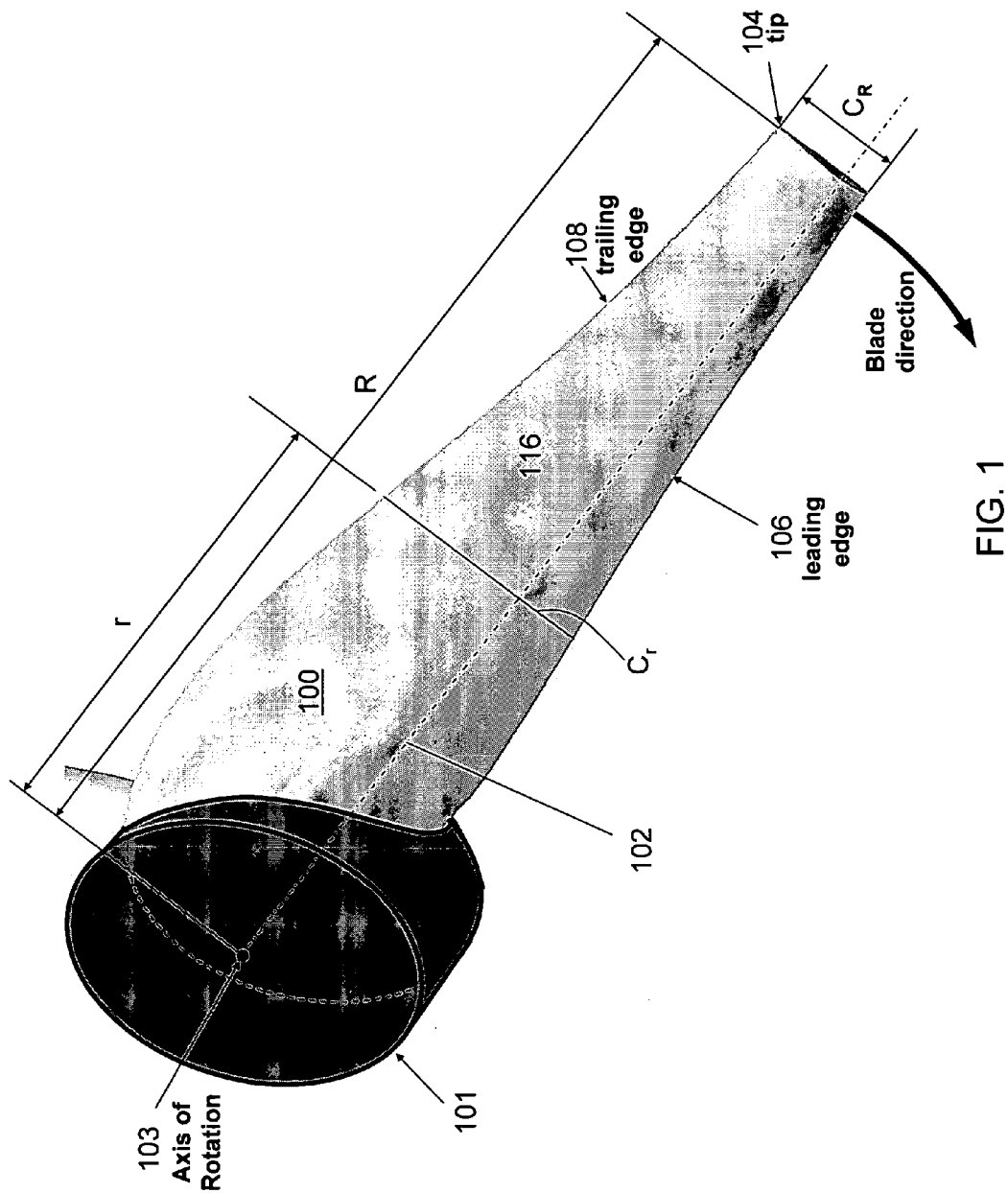
FIG. 1 is a front isometric view of a prior art turbine blade.

FIG. 1 shows a typical prior art rotor blade 100 connected to a hub 101 which forms a part of a rotor that has multiple rotor blades. A rotor typically has two, three, or some plurality of rotor blades 100 which extend out from and are equally spaced about the hub 101, and which rotate around an axis extending through the center of hub 101.

The overall shape of a rotor blade can be defined by the shapes of a plurality of cross-sectional areas called foils which are perpendicular to a line that intersects a common reference point on all the foils, extending from the axis of rotation to a point where the blade terminates. One such common reference point is the point where the foil chord is intersected by a perpendicular line representing the maximum thickness of the foil.

It is useful to define the following coordinates to help describe the shape of blade 100: the axis of rotation 103 (shown as a point in FIG. 1) which is a line going through the center of hub 101 and about which the rotor comprising blade 100 rotates, and a line R which is a line perpendicular to axis of rotation that extends radially from the center of the hub 101 along the length of the rotor blade 100 to tip 104. Further, it is useful to define the direction of rotation, which is indicated as an arrow in FIG. 1 and corresponds to a clockwise rotation direction for the rotor comprising blade 100. It should be noted that rotors can be designed for clockwise and/or counterclockwise rotation.

The direction of rotation also defines the leading edge 106 and the trailing edge 108 of blade 100, where leading edge 106 faces the direction of rotor rotation, clockwise in FIG. 1, while trailing edge 108 faces in the opposite direction. That is, water impinges upon leading edge 106.

Consequently, R is a radial distance from the axis of rotation 103 to the tip 104 of blade 100. R is particularly useful when the common reference point on the foils of a blade are intersected by a line which is parallel to R, as is the case for blade 100 where line 102 intersects all foils at a specified common reference point and is parallel to R. This way, any foil along the length of the blade 100 can be identified as a multiple from 0.0R to 1.0R of the radius R, where r=0.0R corresponds to the axis of rotation 103 and r=1.0R defines the tip 104. Thus, a point half-way between the axis of rotation 103 and the tip 104 along R would be defined as r=0.5R. For blade 100, line 102 intersects the maximum thickness $T_r$ of each foil at the foil's chord. It should be noted that blades can also be set up with some degree of variation from this.

Figure 2:
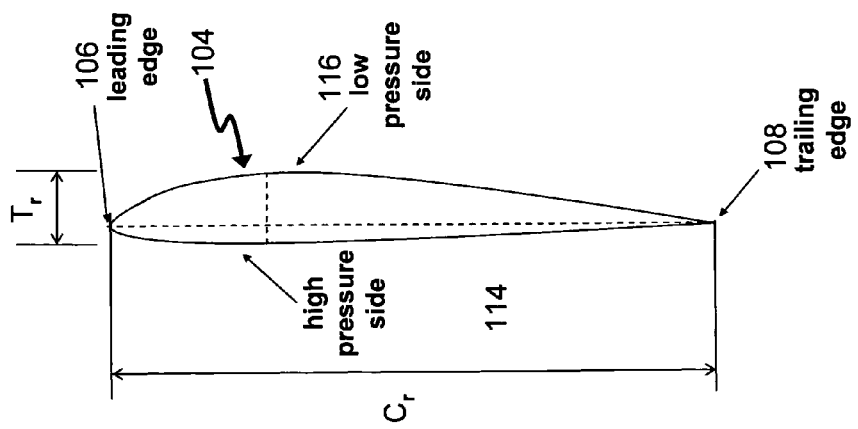
FIG. 2 is an end view of the tip of the turbine blade in FIG. 1.

FIG. 2 shows an enlarged view of the end of blade 100 i.e. looking at the foil of the tip 104. The shape of a foil at a given point along the line 102 joining foils can be defined using the following: the chord, $C_r$, the thickness, $T_r$, and the foil curve.

For a given foil located at r=xR, the chord $C_r$ is the distance between the leading edge 106 and the trailing edge 108. The chord $C_r$ of each foil of blade 100 varies along the radius R. FIG. 1 shows chord $C_R$ which is the chord for the foil located at r=1.0R or at the tip 104 of the blade 100.

Figure 3:
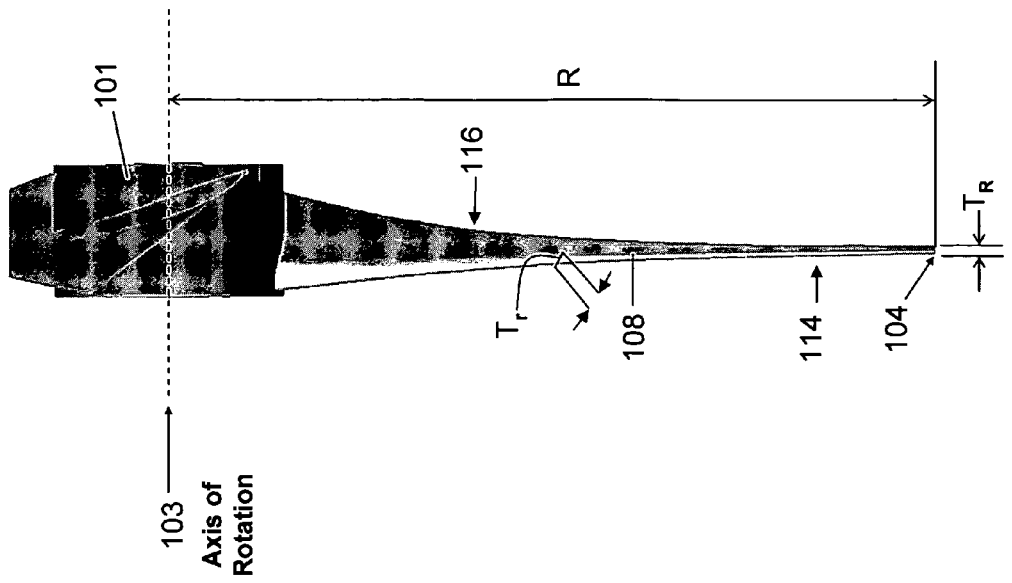
FIG. 3 is a side view of the turbine blade in FIG. 1.

For a given foil located at r=xR, thickness $T_r$ is defined as the longest line in the set of lines perpendicular to the chord connecting corresponding points on each side of the chord, i.e. $T_r$ is the maximum thickness of a local foil at a given r=xR. $T_r$ of the blade 100 also varies along the radius R. Thickness $T_r$ is usually expressed as a percentage of the chord. FIG. 3 shows hub 101 and blade 100 with the trailing edge 108 in the foreground. Thickness $T_R$ in FIGS. 2 and 3 is the thickness at 1.0R or at the tip 104 of the blade 100. For typical blade shapes, the maximum thickness of a foil is generally located at a distance of approximately 25-50% of the chord from the leading edge 106.

The foil curve describes the general shape a foil located at r=xR where the exact shape of the foil is determined by the thickness $T_r$ and chord $C_r$. Thus, the exact shape of a foil can be determined by specifying a foil curve and a relationship of $T_r$ with respect to $C_r$. The relationship between $T_r$ and $C_r$ is typically the ratio of $T_r$ to $C_r$ (thickness ratio $T_r/C_r$), which is typically expressed as a percentage. For example, for a given foil with a foil curve that specifies that the general shape of the foil is an ellipse, if the thickness ratio equals 100%, the exact shape of the foil would be a circle i.e. (thickness equals chord). Likewise, a theoretical foil with a foil curve specifying a general foil shape that is an ellipse with a thickness ratio equaling 0% would have an exact shape of a line (no thickness). Thus, a family of foils can be created by specifying a foil curve and varying the thickness ratio for the foil curve.

Examples of family of foil shapes are the well known NACA families. Where 4-series NACA families define individual foils by a four digit number where the first two digits define the foil curve and the second two digits define the thickness ratio. For example, a NACA 44XX has foil curve that has a camber ("overall curvature") of 4% and the maximum thickness occurs at 40% of the chord from the leading edge. The last two digits, xx equals the two-digit thickness ratio i.e. maximum thickness as a percentage of the chord. It should be noted that when theoretical foil shapes are used to design a blade that the theoretical foil shape specified at an r may be mathematically conformed such that it is different from the actual foil that is perpendicular to R. For example, theoretical foil shapes may be wrapped about a cylinder defined at the r, as described in U.S. Pat. No. 4,613,279. For the sake of simplicity, this description assumes that theoretical foil shapes at an r are that same as actual foils at the r. Further, even when theoretical foil shapes at an r differ from foils at the r, theoretical foil shapes and actual foil shapes can be related by knowing the relationship between the theoretical foil shape and the actual foil.

Figure 4A:
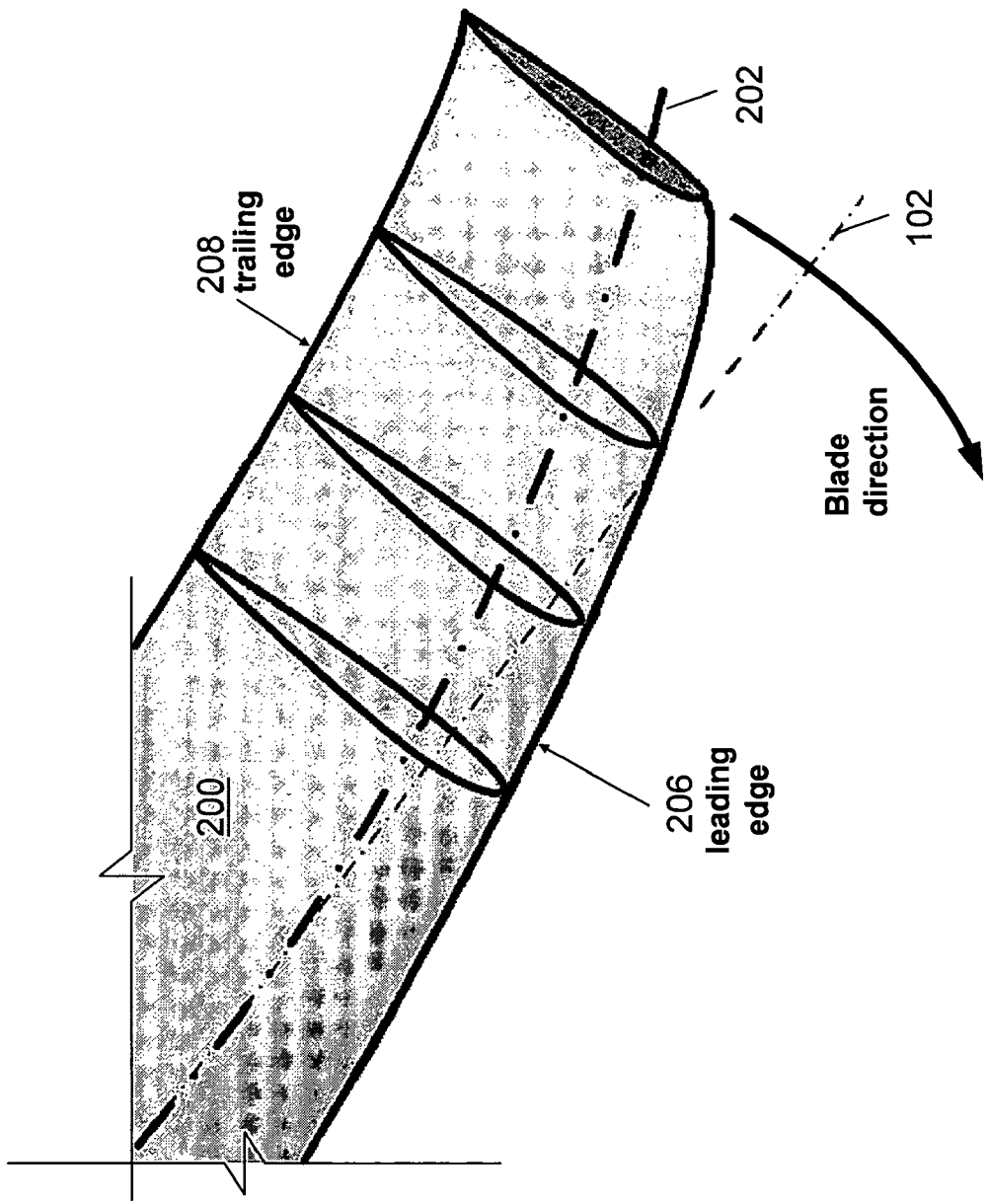
FIG. 4a is an isometric view of a solid prior art swept turbine blade.
Figure 4B:
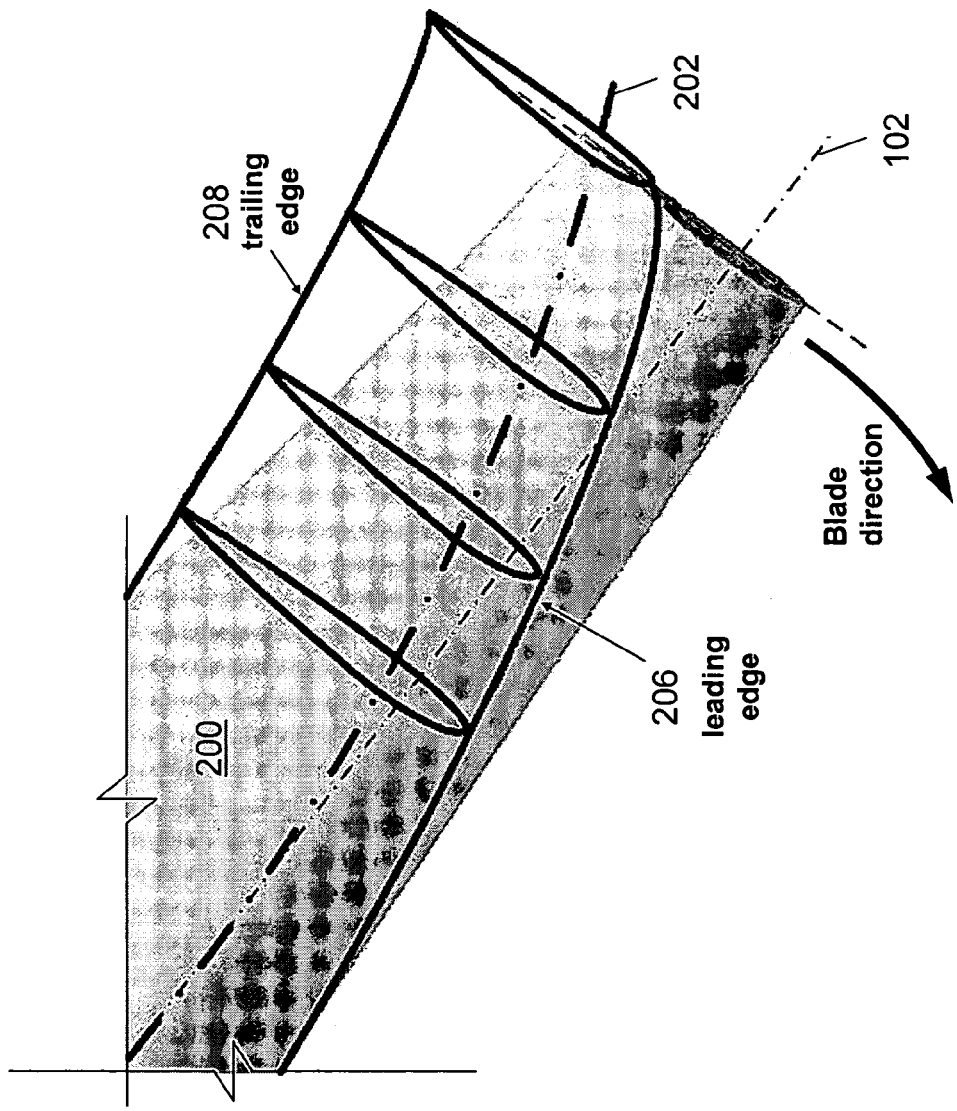
FIG. 4b is an isometric view comparing a prior art swept turbine blade to a prior art straight turbine blade.

FIG. 4a shows a solid representation of blade 200. Blade 200 is typically referred to as a swept blade. Line 202 corresponds to the maximum thickness of the chords along the swept blade shape. FIG. 4b shows the prior art swept turbine blade 200 with the more traditional tapering blade 100. FIG. 4b shows an outline of the swept blade 200 superimposed on a corresponding enlarged portion of blade 100. Portions of swept blade 200 not shown are similar to those of blade 100. Swept blade 200 differs from blade 100 in that at a certain radius, r=xR, line 202 joining foils of blade 200 diverges from a corresponding maximum thickness line 102 for blade 100. As show in FIG. 4b line 202 follows a curved path whereas line 102 follows a straight path. Since a one-to-one correspondence can be determined between points on line R and line 202, foils along the length of blade 200 can be identified by specifying an r=xR where a corresponding foil is parallel to line 202. It should be noted that foils along the length of blade 200 can also be identified by specifying a length along line 202. For some blade shapes, where there is not a one-to-one correspondence between the line R and the line intersecting common reference points on foils it may be necessary to identify foils by specifying a length along the line joining the foils.

It should be noted that although blades are described using a particular convention to define the various dimensions of a blade, such a convention is not intended to be limiting, and the dimensions of a blade could be defined and described using other conventions without departing from the scope hereof.

The overall shape of a turbine blade can be designed by using a standard theory such as Blade Element Momentum theory. Once certain basic blade design parameters are chosen (length, tipspeed ratio, foil curves, thickness taper, etc.), such a theory indicates the optimum chord length and twist angle for the foil shape at each radial position. A more complete discussion of Blade Element Momentum theory as well as basic blade design theory can be found in the text Wind Energy Explained, Theory, Design and Application by Manwell et al.

Blade Element Momentum theory assumes that fluid passing over the foil shape at each point is independent of fluid passing at any other point along the blade, i.e. there is no flow or momentum exchange in the transverse or radial directions. This assumption is generally reasonable, except at the blade tip, where the flows over the two surfaces reunite. Here, and near this blade end region, there is a flow in the radial direction (along the blade axis) which reduces the pressure on the high-pressure face 114 of the blade and increases pressure on the low-pressure face 116, thereby reducing blade efficiency. Also, because there is a net flow from the high-pressure face 114 towards the low-pressure face 116, a flow is induced in a direction perpendicular to the flow over the blade toward the tip. This results in an energized tip vortex which saps energy capture from the rotor. Since it also disturbs the flow downstream, it can also negatively impact other turbines in an array of kinetic hydropower turbines. Similarly, for airplanes, tip vortices can induce important levels of drag and have other effects on airplanes.

Normally, due to structural, weight, material use, and efficiency considerations, rotor blades have a thickness ratio that tapers from the thickest portion in the root area near the hub 101 to the thinnest portion at the tip 104. For example, a current five meter diameter turbine blade tapers linearly from 17% thickness ratio at the hub to 11% thickness ratio at the tip. Because lift and drag properties vary with thickness, standard blade theory and design approaches tend to result in foil shapes with smaller chords and lower thickness ratios as r increases towards the tip (r=R). Thus, with increasing radial position, the blade tapers in both thickness and chord which results in foil shapes with a progressively decreasing cross-sectional area as the tip is approached. A current turbine blade five meters in length can incorporate a family of NACA 44XX foil curves designed using Blade Element Momentum theory. Such a blade can have a NACA 4417 foil shape at the hub and a 4411 foil shape at the tip where the blade tapers in cross-sectional area from the hub to the tip. As shown in FIGS. 1 and 4a, prior art blade designs have a maximum thickness and chord where the blade attaches to the hub 101 and thereafter taper progressively toward the tip and decreasing to a minimum thickness and a minimum chord at the tip.

As determined by laws of fluid dynamics, fluid flow over a wing or rotor blade is non-ideal near the tip, since the pressure differential between the two faces cannot be maintained as the separated flow on both sides rejoin adjacent to the tip. Also, a net radial flow develops outwardly on the high-pressure blade face 114, and sometimes inwardly on the low-pressure face 116, potentially giving rise to a vortical flow. Similarly in an airplane, as fluid flows from below a wing out and around the tip to the top of the wing, a circular vortex will develop.

As a result, the net radial flow near the tip 104 is not that which is assumed by the blade design theory—essentially in line with the foil profile (substantially tangential or chordwise or perpendicular to the blade length). This radial fluid flow is not what was designed for and cannot provide as much of a lift force vector (in the direction of the low pressure surface) for a wing, and similarly, less of the desired torque vector for a rotor blade, and not as much useful torque or power.

Figure 5:
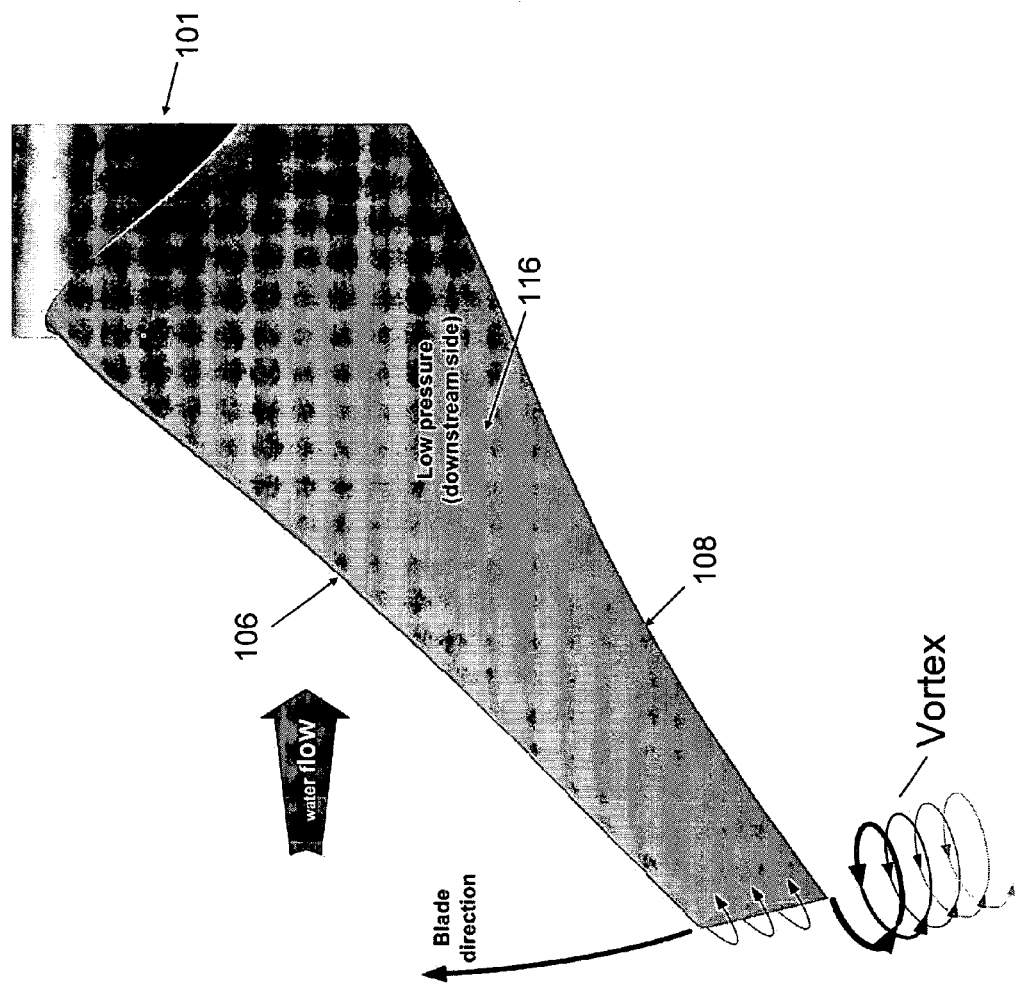
FIG. 5 is a diagrammatic view showing known vortex effects of the prior art turbine blade in FIG. 1.

Tip vortices are continuously shed by the wing or rotor blade, carrying energy with them downstream, as illustrated in FIG. 5.

Aircraft designers have attempted to reduce the negative phenomenon of wing tip vortices, or at least the induced drag effect of tip vortices, with various tip designs that help prevent this circular flow either by blocking it or inducing an opposing flow. For many of them the associated increase in parasitic drag does not warrant the device. A newer approach, the winglet is successfully used on high-speed high-altitude jet aircraft.

Certain wind turbine rotor blades are using similar tip treatments. Wind turbines have very different constraints for weight, strength at the tips, and noise, and tip vanes are not common on large turbines. The Enercon wind turbines use a modern winglet-type tip. Reference is made to disclosed documents describing such rotor blades.

Such known wing tip treatments designed for use in air flow environments cannot be used underwater due to the potential for fouling by hitting and collecting plants and other debris which may be trapped by the vane or wrapped there around so that it is not easily shed by the blade.

DETAILED DESCRIPTION OF THE PRESENTLY PREFERRED EXEMPLARY EMBODIMENTS

In the new turbine blade design, the blade has a shape that begins with and for the initial portion of its length follows the usual blade shape theory where the design progressively tapers as discussed above. However, at a particular location along the length of the blade that foil shape is modified compared to what it would normally be as specified by the usual blade shape theory. Examples of changes to the foil include, but are not limited to: scaling in size without a changing the thickness ratio (e.g. a bigger foil of the same shape), changing the thickness ratio (i.e. the foil becomes a different foil within the family), scaling the size of the foil after changing the thickness ratio. The thicknesses and chords of the foils located beyond the modified foil are then manually modified or allowed to be modified automatically as provided by the theory. In summary, at a desired point along R, the modified blade design stops the progressive tapering and enlarges in cross-sectional area from that point toward the tip to end at an enlarged cross-sectional tip.

The first exemplary embodiment relates to a modified turbine blade tip design using a faired shape design that increases the tip area efficiency of a kinetic hydropower turbine rotor blade, while also exhibiting a non-fouling characteristic. A blade with an expanded tip described herein provides improved blade and rotor efficiency for increased energy capture, while using a non-fouling tip from which debris is shed. Additionally, a modified blade tip provides for a more durable blade tip, and greater rotational inertia at the tip resulting in smoother operation of the rotor and attached rotating machinery.

In this new blade design, the blade has an expanding shape towards the tip that reverses the otherwise progressive taper of the blade. This achieves the desired result of keeping the flow of fluid straight over the blade rather than off the tip, lessening the tip vortex, while still having a shape that does not tend to catch debris. This tip modifies fluid flow patterns there around by forcing the flows that would otherwise leave or come off both blade surfaces at the tip to remain flowing over their respective surfaces, thereby increasing blade efficiency.

For this new blade design the blade follows the standard blade shape until a particular point along R is approached. The particular foil at this point is expanded and foils located there beyond are automatically modified and progressively enlarged according to the standard blade theory. Following the theory for the foils beyond the particular foil, after modifying the particular foil, results in a blade shape that has dimensions increased in both the chordwise and thickness directions. This produces an unusual, but still near-optimum blade shape that near the tip still produces a non-fouling tip shape.

There are a number of parameters that can be varied in creating this family of expanded blade designs: For example, first, the radial point at which blade expansion begins; second, any number of blade thickness/chord expansion tapers could be used, such as linear, power, or exponential; third, the ultimate thickness percentage used at the very tip. When the thickness ratio of foils is increased (and the usable angle of attack decreases) Blade Element Momentum theory will automatically increase chord length according to other design parameters. Thus, under Blade Element Momentum theory simply changing the thickness percentage of a foil will result in a foil with an increased cross sectional area. Also, the twist angle of the blade in the expanded blade region can be modified from the standard blade to maximize performance. An expanded blade design can be applied with variations such as applying the expanded blade airfoil shape such that the leading edge remains in the same circumferential position, which may avoid any increased tendency to foul. An expanded blade can also be combined with other rotor blade design variations designed to improve practical performance and survivability, such as swept blades which may improve fouling shedding behavior. Furthermore, the ultimate outer, circumferential edge of the blade tip can be sharp or rounded in various ways.

Figure 6:
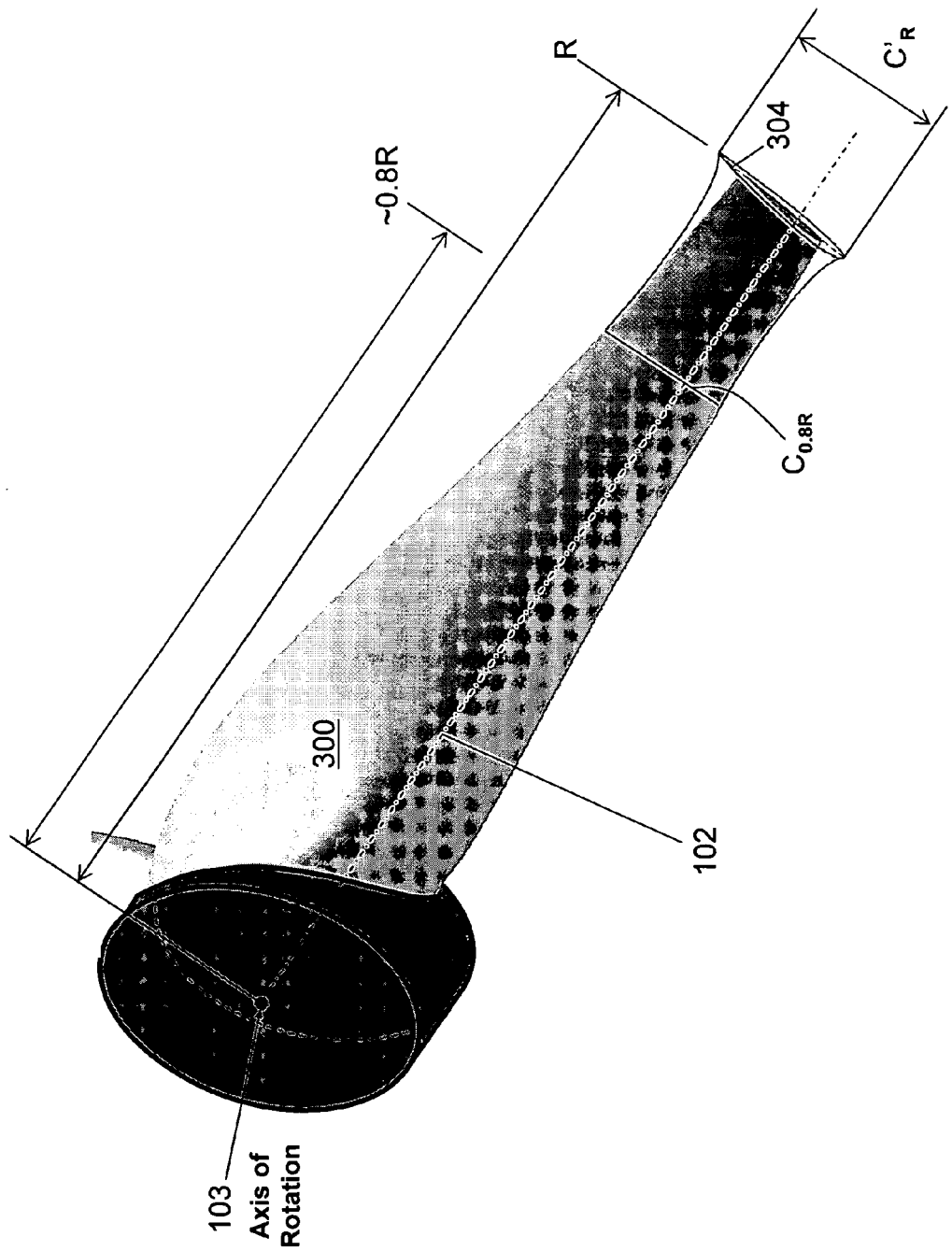
FIG. 6 is an isometric view comparing an exemplary embodiment of a modified turbine blade with an enlarged tip to the prior art turbine blade shown in FIG. 1.

FIG. 6 shows one embodiment of a new blade design. Blade 300 is connected to and extends from hub 101. As shown, the design of blade 300 conforms to the shape of blade 100 until a point about r=0.8R. It should be understood, however, that the point 0.8R is not critical and the point at which the blade shape modification can begin varies from about 0.4R to about 0.95R.

Blade 300 differs from blade 100 in that the thickness $T_r$ (and accordingly the chord $C_r$ in accordance with Blade Element Momentum theory) stops being decreased and is actually increased relative to the standard blade beginning at a point about equal to r=0.8R.

Figure 8:
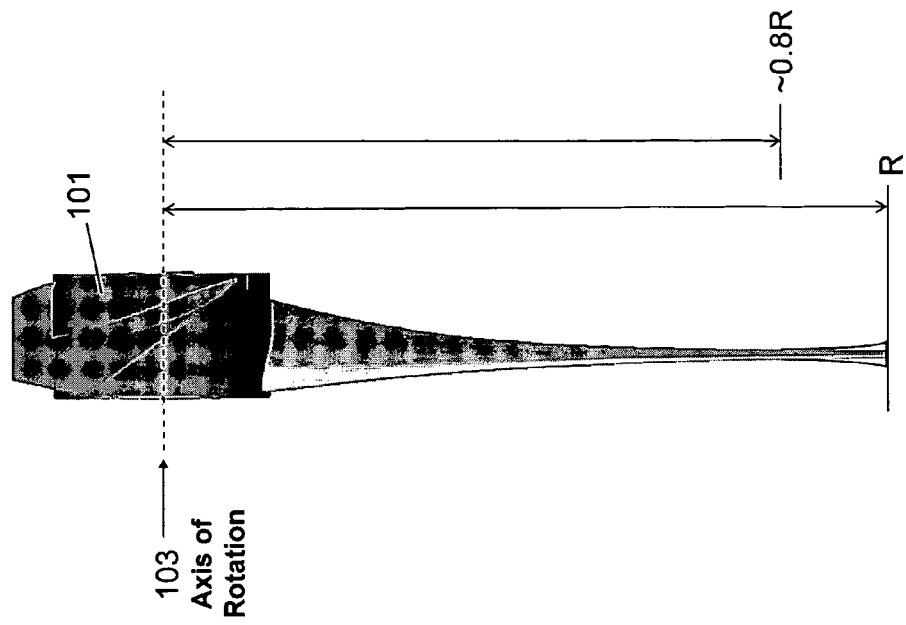
FIG. 8 is a side view showing a comparison of a modified turbine blade with an enlarged tip to a prior art turbine blade shown in FIG. 3.
Figure 9:
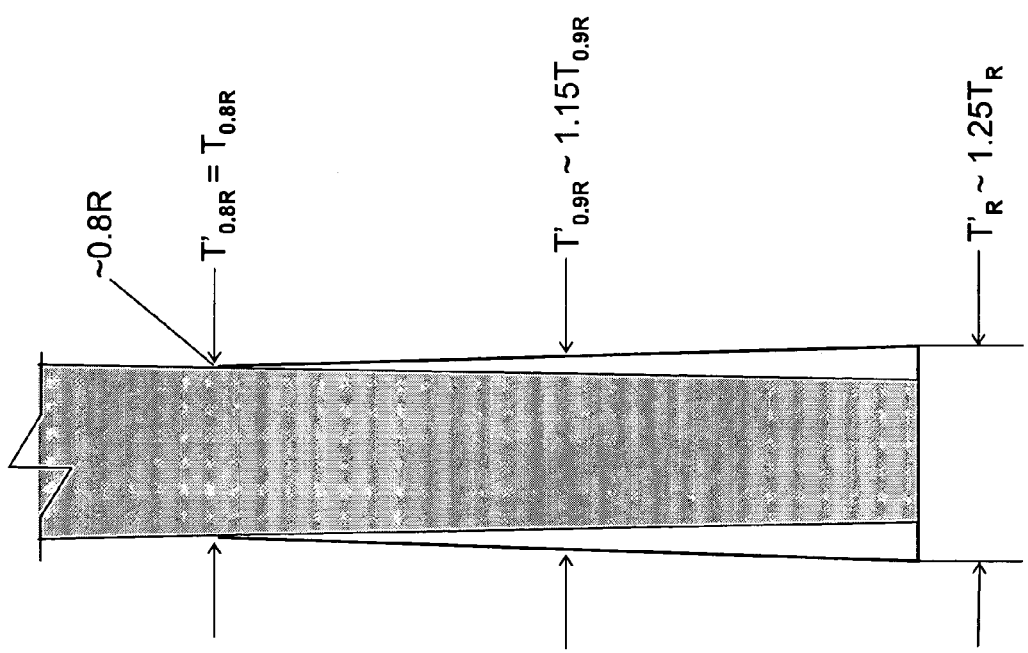
FIG. 9 is an enlarged detailed view of a portion of FIG. 8.

As shown in FIG. 6 at the point r=0.8R the thickness and taper of blade 300 begins to be modified from blade 100 by increasing the thickness, and the local chord begins to enlarge accordingly from its prior shape. As shown in FIGS. 8 and 9, the thickness is increased gradually so as to make a smooth transition, but preferably to make a tip that is expanded in both the thickness dimension and the chordal dimension. However, it is contemplated that the modified blade design could expand or enlarge only the thickness dimension or only the chordal dimension and still achieve improved blade efficiencies. This taper or schedule of thickness increases over the standard shape can be varied. The increase in thickness can typically result in a 0% increase in both thickness and chord at the starting point of r=0.8R and an approximately 15% increase in thickness and chord at r=0.9R and an approximately 25% ultimate increase in thickness and chord at the tip (r=R).

In a similar fashion, the edgewise views in FIGS. 8 and 9 show the blade thickness also progressively increasing from r=0.8R to the tip (r=R). In this way, the outer section of the rotor blade 300 enlarges simultaneously in both length and thickness.

Figure 7:
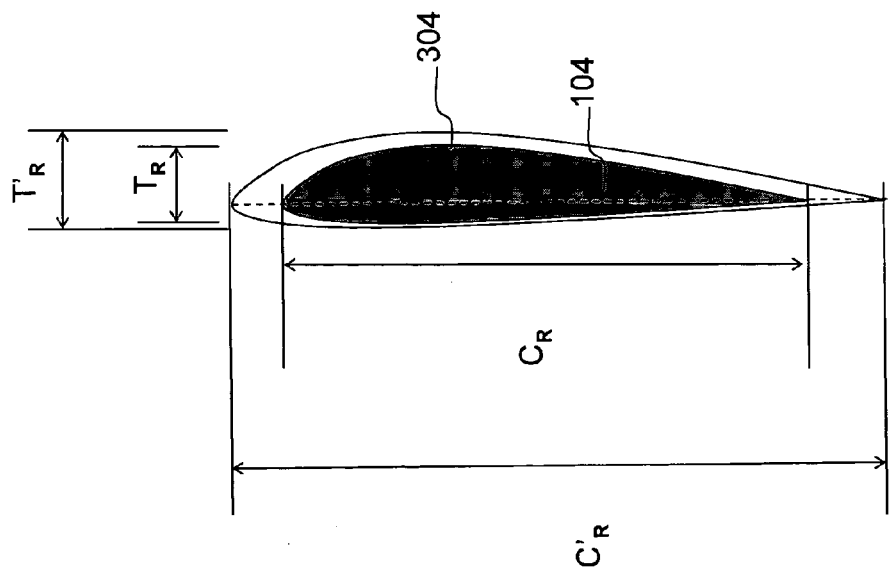
FIG. 7 is an end view comparing an exemplary tip end of a modified turbine blade with an enlarged tip to a prior art turbine blade tip shown in FIG. 2.

The end view of FIG. 7 shows the contrast between the shaded portion 104, corresponding to the tip end area of the normal, prior art tapered end from FIG. 1, versus the enlarged end area 304 corresponding to the enlarged tip section of the new blade design where $C_R$ and $T_R$ denote the original chord width and thickness of blade 100 at the tip and $C'_R$ and $T'_R$ denote the new expanded chord and thickness of blade 300 at the tip.

The thickness ratio of both blades 100 and 300 at their foils adjacent to hub 101 is typically around 17%. The thickness ratio of both blades 100 and 300 at about r=0.8R is typically around 13%. At about r=0.9R, the thickness ratio of blade 100 is typically around 12% while for blade 300 the thickness ratio is expanded to about 14%. At the tip (r=R), the thickness ratio of blade 100 is typically around 11% while for blade 300 it is expanded to about 16%. Since blade 300 still follows Blade Element Momentum theory the result of an increase in the thickness ratio results in the chords expanding accordingly. These thickness ratio values vary according to the overall blade design and the specific starting point (r) and rates of increasing section thickness used in the a particular application can vary.

The overall effect on the shape of the new version blade 300 is that once the thickness $T_r$ and chord $C_r$ dimensions have reached minimum values at approximately 0.8R they then increase with r until they reach tip 304. For the enlarged tip 304 the values of the chord width $C_R$ and thickness $T_R$ of the blade 300 are typically 5% to 30% greater than those in the original blade 100 and progressively change from 0.8R to the tip 304. Any number of expansion regimens could be used, such as linear, power, exponential, etc., to determine how thickness (and accordingly, chord) increase from the minimum values to the enlarged dimensions of blade 300. The beginning of the shape expansion could be chosen to result in a shape change that is anything from very gradual to abrupt. It should be noted that the point at which expansion begins need not be the point where $T_r$ and $C_r$ have absolute minimum values. For example, a blade could begin to expand at 0.8R, and as r increases, the values of $T_r$ and $C_r$ will be larger than the standard blade, but still may not reach their absolute minima until further out on the blade, and expand there after.

The reversal of normal tapering of blade 300 can occur at about 0.8R. However, as noted previously the point at which the taper reversal begins can be located at any reasonable radius with a nominal range, for example between about 0.4R to about 0.95R. Different expansion starting points and different expansion tapers can be used with the other standard blade design parameters to optimize blade and rotor performance in terms of factors such as power and non-fouling behavior.

Figure 10A:
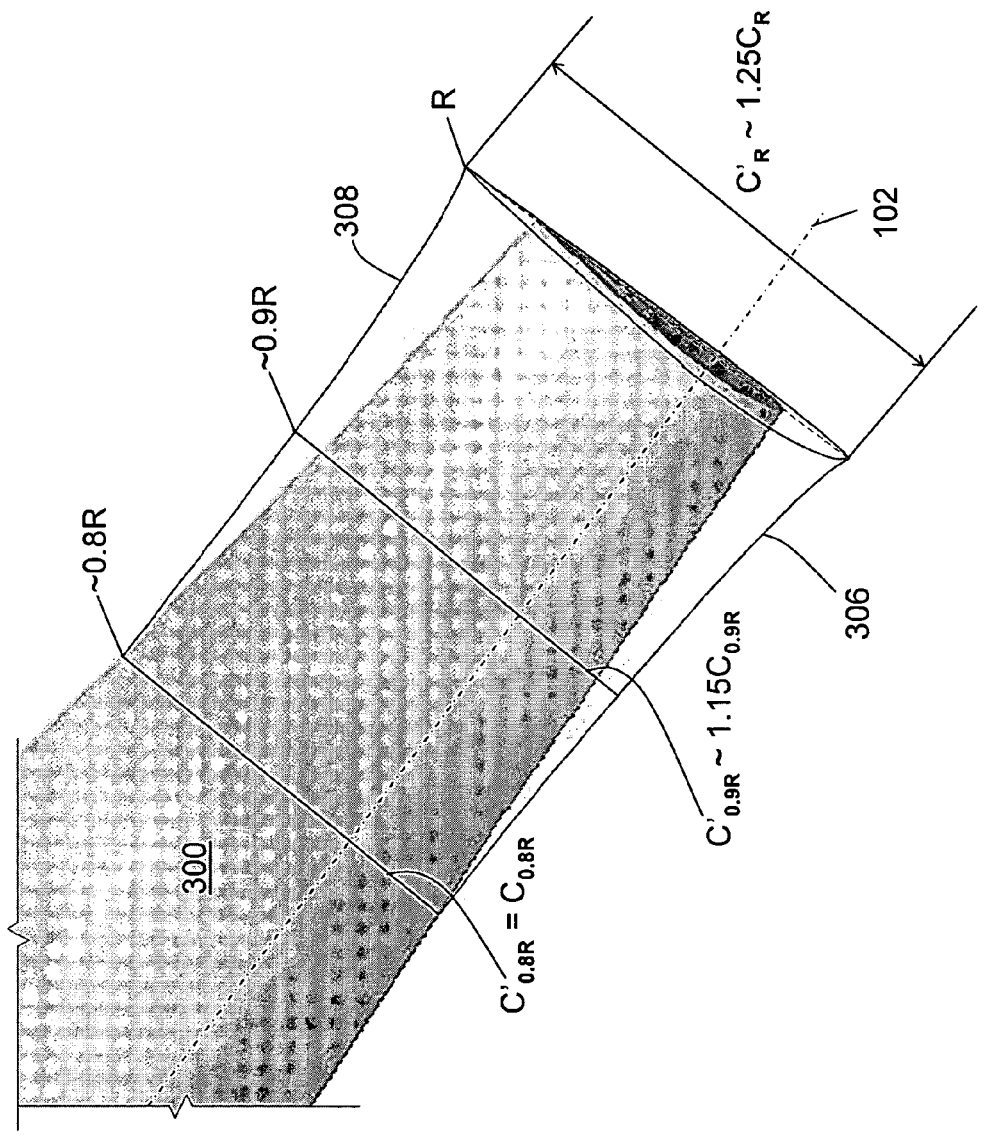
FIG. 10a is an enlarged isometric "wireframe" comparison of an exemplary embodiment of a modified turbine blade with an enlarged tip to the prior art turbine blade of FIG. 1.
Figure 10B:
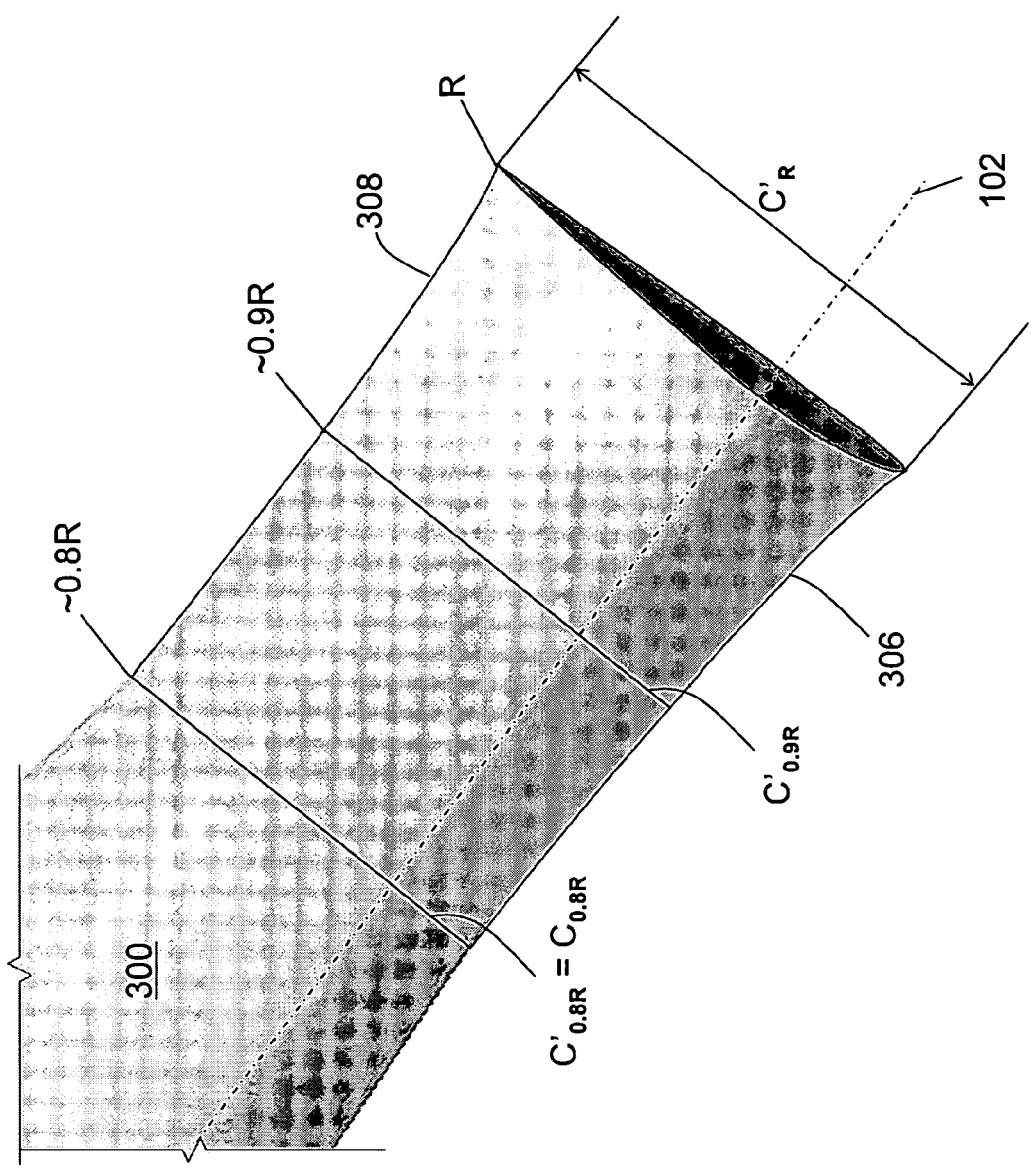

FIG. 10a shows an enlarged view comparing the expanded portion of blade 300 to the normal tapering of blade 100, where typical relationship values between the respective dimensions can be compared. FIG. 10b is a solid depiction of the enlarging portion of blade 300 corresponding to what is shown in FIG. 10a.

It should be noted, as described above, that values in FIGS. 9 and 10a only represent typical values and are shown for solely exemplary purposes and are not intended to be limiting. Further, although blade 300 increases both in chord and thickness at a given point, it is possible to expand the cross sectional area of a blade in only one of chord or thickness without expanding in the other dimension. Such an expansion would result in a blade that does not precisely follow Blade Element Momentum theory.

As shown in FIG. 6, blade 300 is expanded relative to the shape of blade 100, in such a way that foils of blade 300 located beyond the point where expansion begins (i.e. foils located between 0.8R and R when expansion begins to occur at 0.8R) are aligned about line 102 corresponding to the maximum foil thickness.

Figure 11:
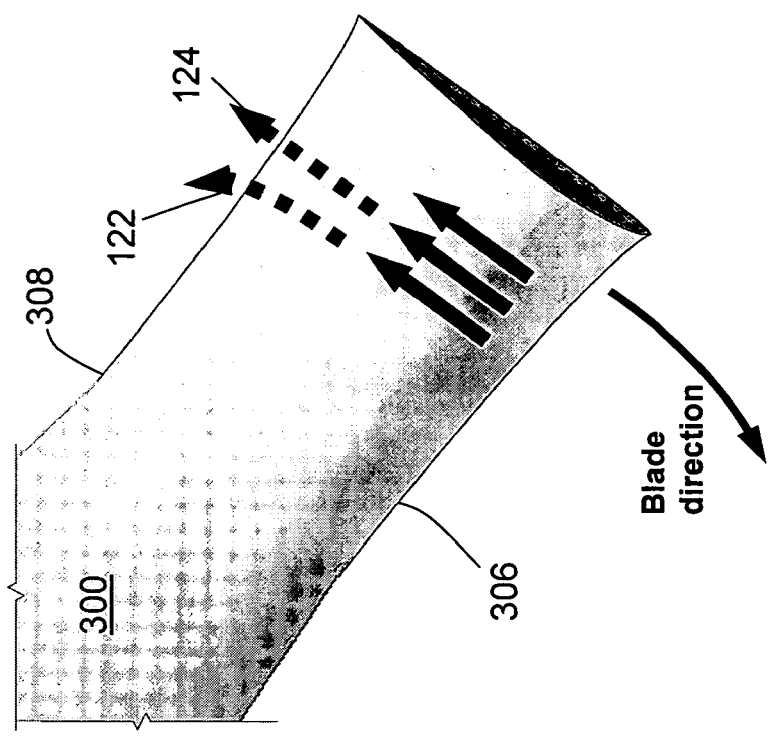
FIG. 11 is a enlarged diagrammatic view comparing the forces on the flow developed by a prior art turbine blade to the forces on the flow developed by a modified turbine blade with an enlarged tip, and the resultant flows.
Figure 11:
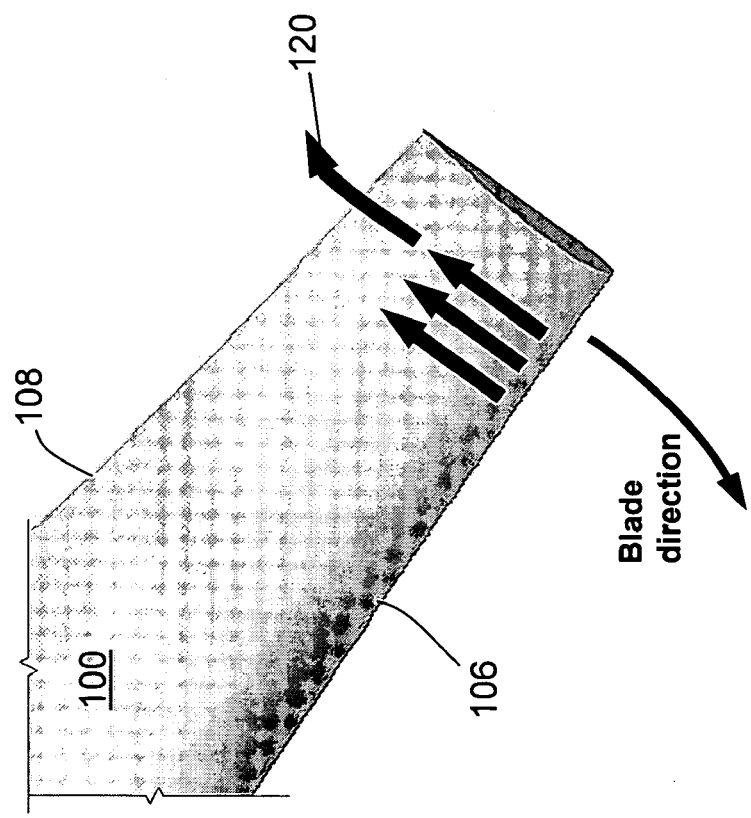

The effect of the new blade shape is to impart to the fluid passing over it and especially adjacent tip 304, some momentum in an inward (toward the axis of rotation) direction to help counteract the tendency of the flow to circulate outward around the tip as shown in FIG. 5. FIG. 11 is a diagram illustrating the flow of fluid over a blade with a non-expanded tip, such as blade 100 compared to a blade with an expanded tip, such as blade 300 with 306 showing the leading edge, 308 the trailing edge and 304 the tip. In FIG. 11 the arrows represent fluid flowing over the low pressure side of a blade where the blade is rotating in the clockwise direction as shown by the blade direction arrow. The solid arrows 120 represent fluid flow for a conventional, tapering blade design such as for blade 100. As described in accordance with FIGS. 4 and 5 and illustrated by arrow 120 for conventional blades there is a tendency for flow to exit from and circulate about the tip of the blade causing vortices. The dashed arrows 122 and 124 represent fluid flow for a blade with an expanded design such as blade 300. As illustrated by arrow 122 a blade with an expanded design has a tendency to direct the flow of fluid inwardly away from tip 304. Arrow 124 shows the desired net of flow remaining over the foil shape and exiting from the trailing edge.

Figure 12A:
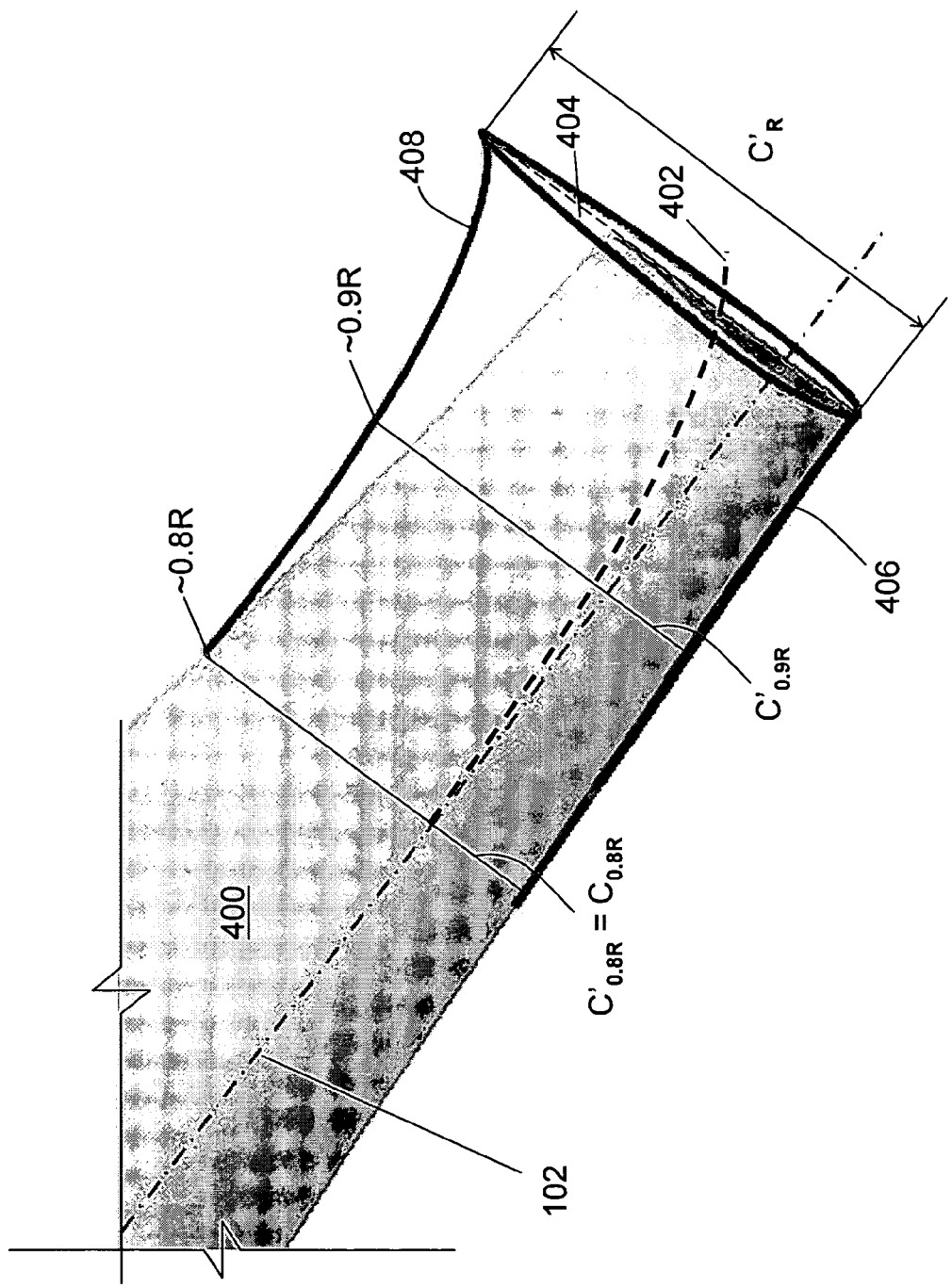
FIG. 12a is an enlarged isometric comparison of an exemplary embodiment of a modified turbine blade with an enlarged tip to the prior art turbine blade of FIG. 1 where the leading edges are aligned.
Figure 12B:
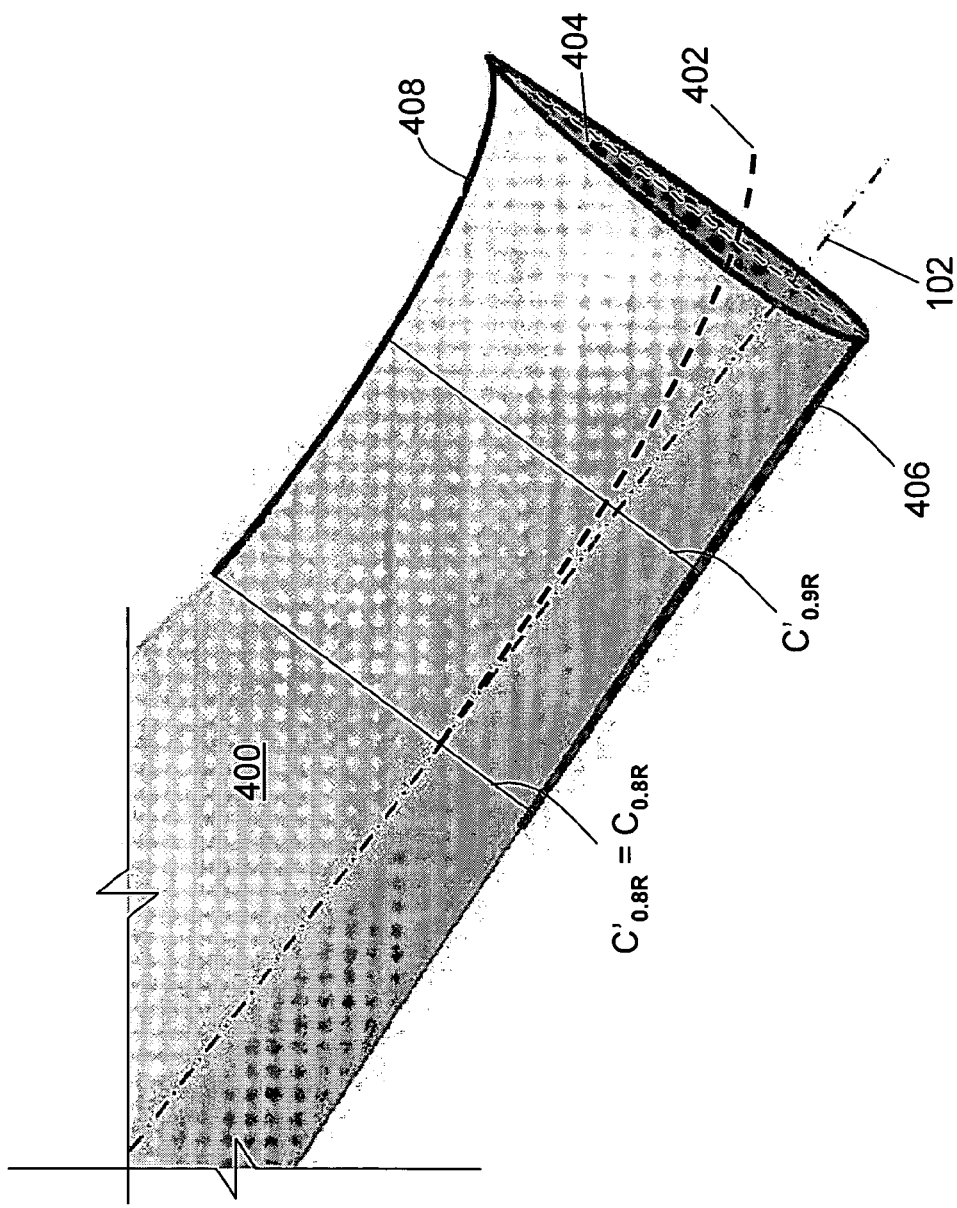
Figure 13:
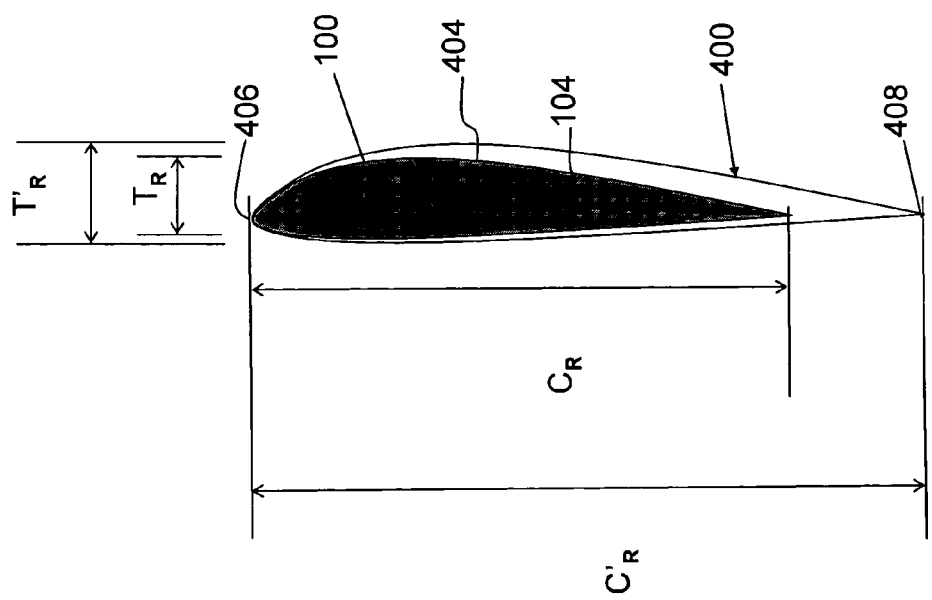
FIG. 13 is an end view comparing an exemplary tip end view of the modified turbine blade to the tip end view of a prior art turbine blade tip.

FIGS. 12a-13 show an alternative embodiment where a modified blade 400 is expanded relative to conventional blade 100 in such a way that the respective foils of blades 100 and 400 share a common leading edge, 406, as opposed to a common line intersecting maximum thicknesses. FIG. 12a shows an outline of the modified blade 400 on top of blade 100. Portions of blade 400 not shown are similar to those of blade 100. Like blade 300, blade 400 has the same dimensions as blade 100 until a selected point, shown as r=0.8R, at which the trailing section of blade 400 begins to expand forming an enlarged and modified trailing edge 408. Blade 400 is expanded to result in progressively increasing thickness and chord dimensions, yet the foils of blade 400 are aligned on the leading edge 406 that is inline with the leading edge of blade 100 (shown at 106 in FIG. 1). Thus, a line 402 intersecting the maximum thickness of each foil of blade 400 would deviate from line 102. FIG. 12b shows a solid representation of blade 400.

The end view of FIG. 13 shows the contrast between the shaded portion 104 of blade 100, corresponding to the tip end area of the normal, tapered end, versus the enlarged end area 404 corresponding to the enlarged tip section of the new blade design where $C_R$ and $T_R$ denote the original chord width and thickness of blade 100 at the tip and $C'_R$ and $T'_R$ denote the new expanded chord and thickness of blade 400 at the tip. FIG. 13 illustrates that blade 100 and blade 400 are aligned about a common leading edge 406 rather than about a common line intersecting the maximum thickness of respective foils as was the embodiment represented by modified blade 300. By having blade 400 share a leading edge with blade 100 any chance of increasing fouling around that area by expanding the blade in the direction of rotation towards the leading edge is eliminated.

Figure 14A:
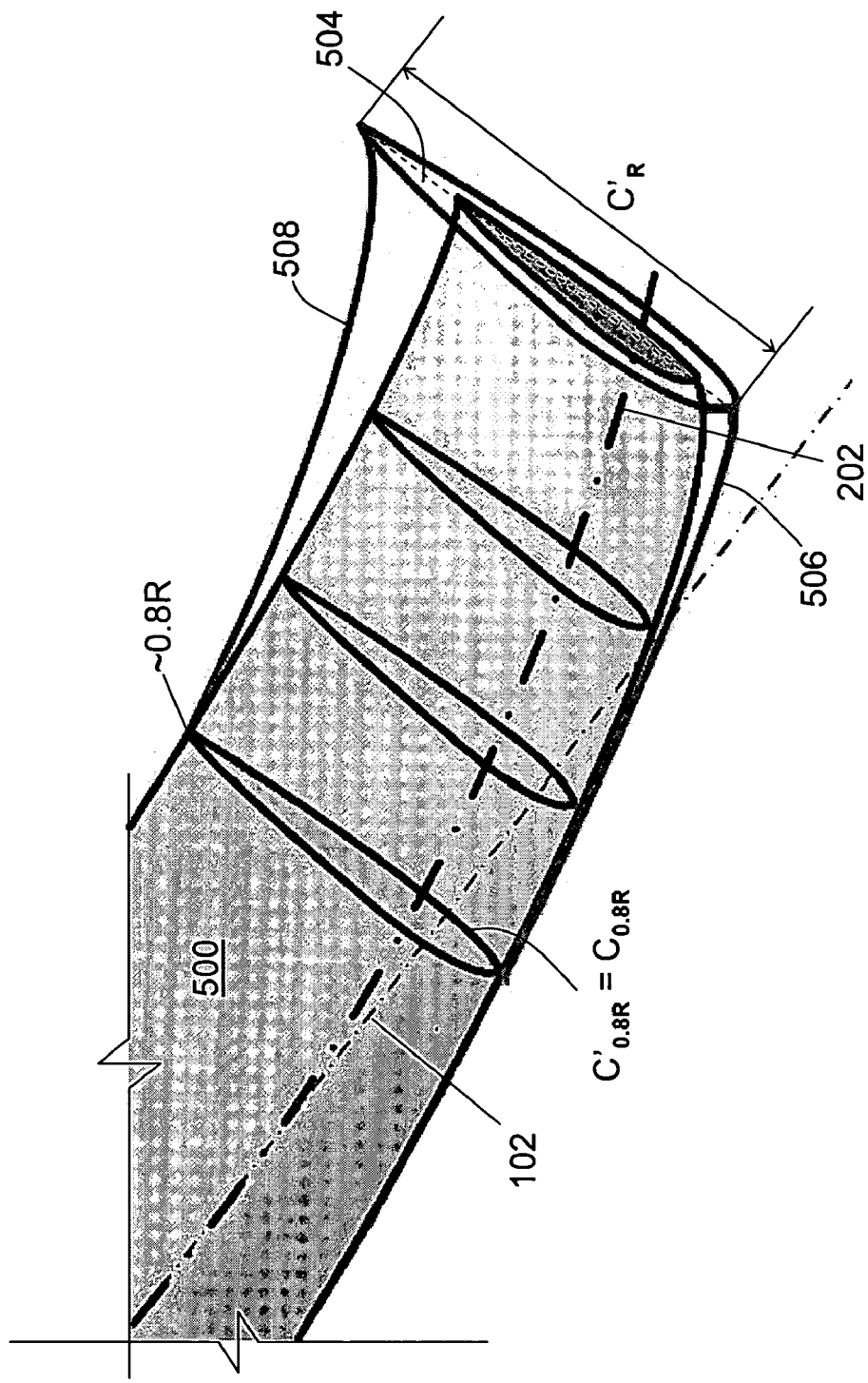
Figure 14B:
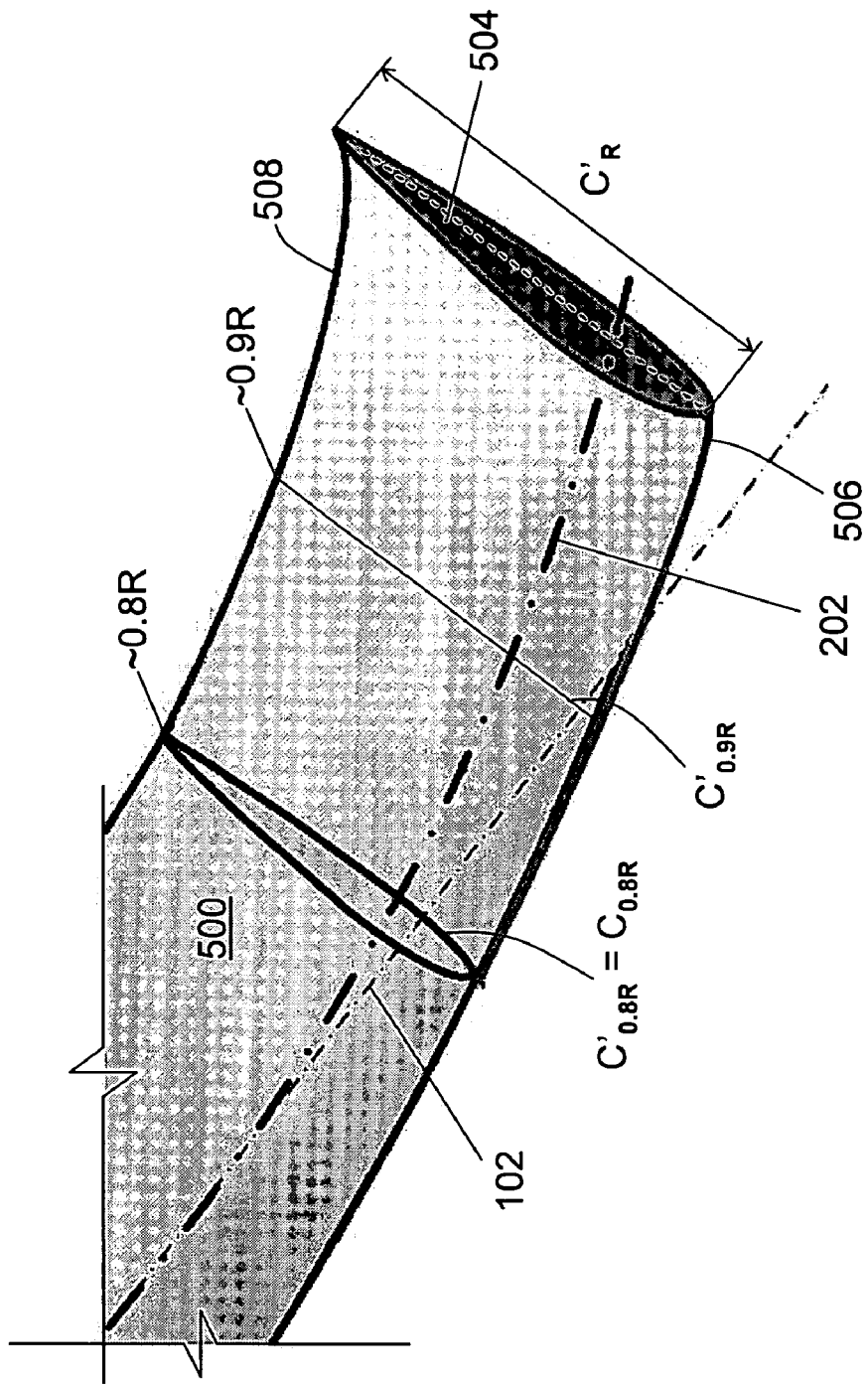

FIG. 14a shows another alternative embodiment of an expanded blade design where blade 500 is expanded about a curving swept wing line 202 corresponding to the maximum foil thickness for the swept wing. Thus, the leading and trailing edges, 506 and 508, respectively, are both expanded beyond a normal tapered blade design. Blade 500 is expanded relative to blade 200, shown in FIG. 4a, in a similar manner as to the way blade 300 is expanded relative to blade 100 as described in accordance with FIG. 6. That is, the design of blade 500 conforms to the shape of blade 200 until a point, shown, for example, at r=0.8R, at which point blade 500 begins to expand in both thickness and chordal dimensions about blade 200. Blade 500 expands relative to blade 200 in such a way that foils of blade 500 located beyond where the point where expansion begins (i.e. foils located from 0.8R to R when expansion occurs at 0.8R) are aligned about line 202 i.e. foils blades 200 and 500 all have maximum thickness along line 202 and end at tip 504. The expansion parameters (e.g. where expansion begins and how the blade is expanded) are similar to those of blade 300 and as such for sake of brevity will not be further described herein. Reference is made to the description of blade 300 above. FIG. 14b shows a solid representation of the modified swept wing shape for blade 500.

Figure 15A:
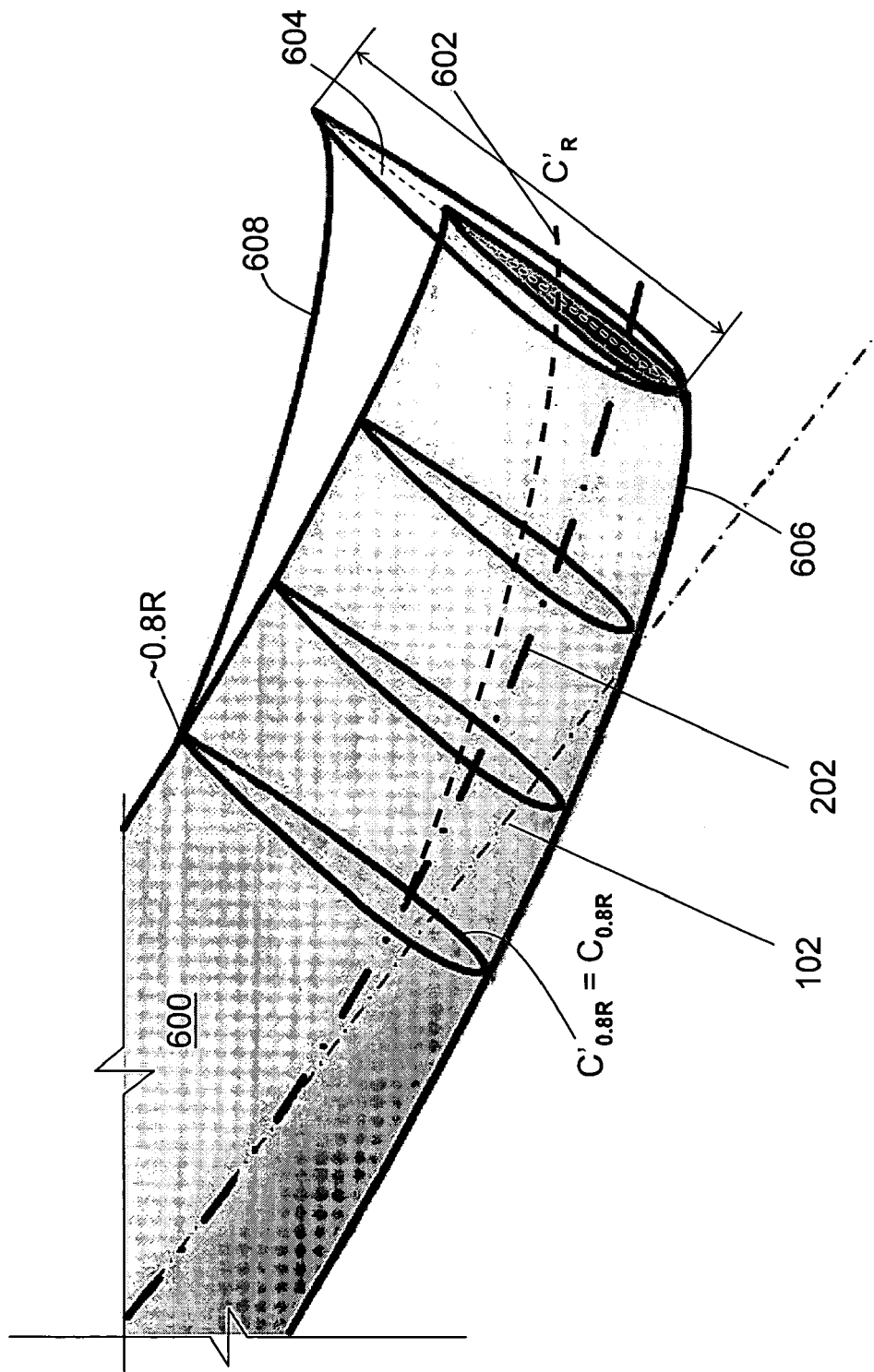
FIG. 15a is an enlarged isometric comparison of an exemplary embodiment of a modified, swept turbine blade with an enlarged tip to the prior art turbine blade of FIG. 4a where the leading edges are aligned.
Figure 15B:
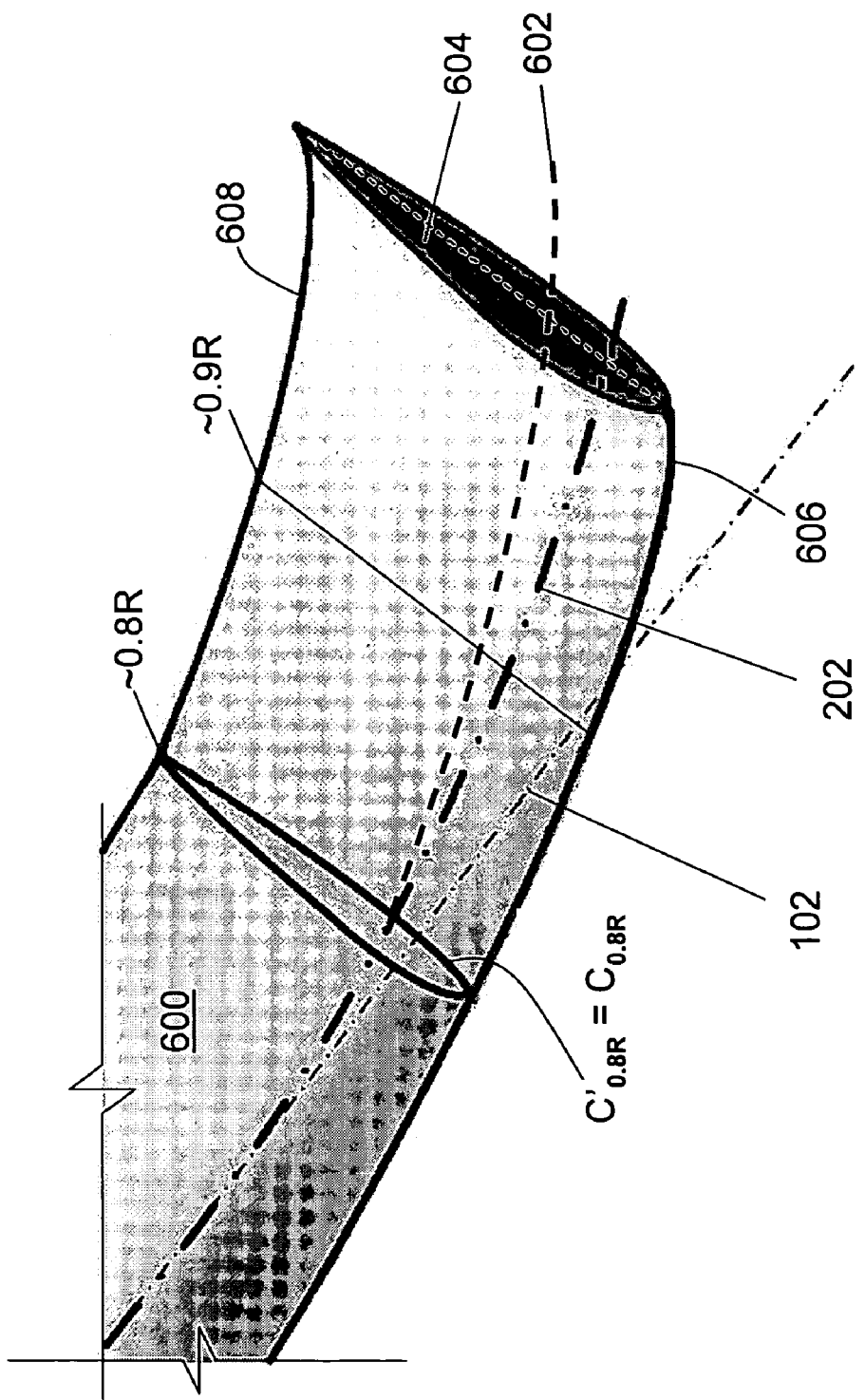

FIG. 15a shows an alternative embodiment where blade 600 with a leading edge 606, a trailing edge 608, and a tip 604, is expanded relative to blade 200 in such a way that the respective foils of blades 200 and 600 share a common leading edge 606. FIG. 15a shows an outline of blade 600 superimposed on blade 200. Portions of blade 600 not shown are similar to those of blade 200. Like blade 500, blade 600 has the same dimensions as blade 200 until a selected point, shown, for example, at r=0.8R, at which point blade 600 begins to expand. The way blade 600 is expanded relative to blade 200 is similar to the way blade 500 is expanded about blade 200 i.e. blade 600 can be expanded about blade 200 in any way that blade 500 can be expanded about blade 200 as described above. However, the respective maximum thicknesses of foils of blade 500 are aligned on line 202 and the foils of blade 600 are aligned on the leading edge that is inline with the leading edge of blade 200. Thus, a line 602 intersecting the maximum thickness of each foil of blade 600 would deviate from line 202. FIG. 15b shows a solid representation of blade 600.

It should be noted, that in addition to those described above, several other alternatives to locating the direction of the expansion centered on the standard tip may be used, to direct the expansion in any direction relative to it. In particular, the direction of expansion can be located so as to be primarily or entirely towards the high-pressure face of the blade so as to keep the fluid flowing over it from flowing off the tip of the blade. These can be done in combination, such as to locate the expansion nearly in line with the pre-existing leading edge and towards the high-pressure side.

Figure 16:
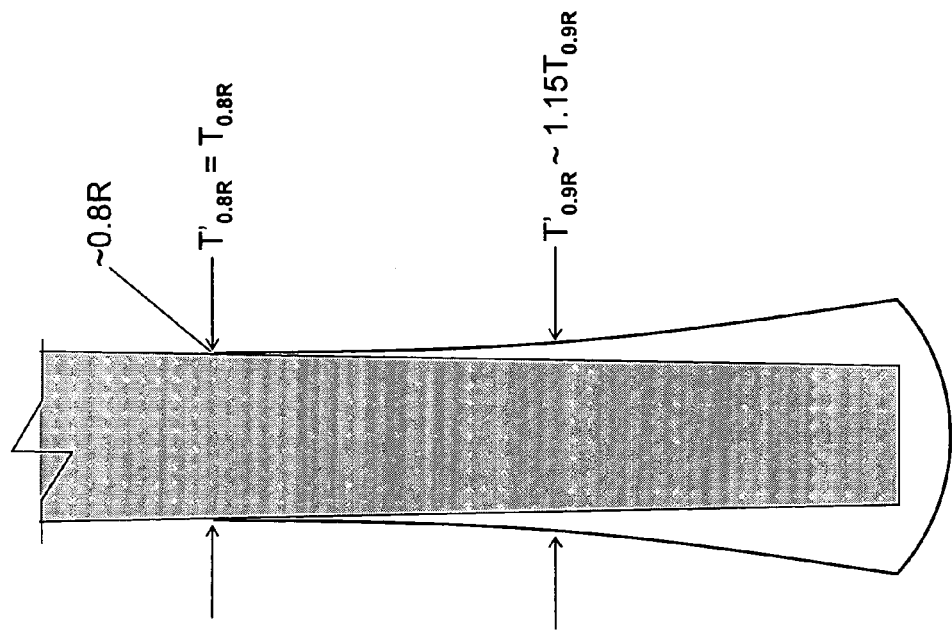
FIG. 16 is a side view showing a comparison of a modified turbine blade with an enlarged tip to a prior art turbine blade.

FIG. 16 shows a comparison between a modified turbine blade tip to a prior art turbine blade tip. The modified turbine blade tip shown in FIG. 16 has an end that is different from the prior art turbine blade tip end. That is, the modified blade tip has a curved end as opposed to a blunt end that is perpendicular to the blade length. The modified turbine blade tip can be incorporated with any of the modified blades described above. Further, the end of a standard blade can be modified by terminating the blade with any number of curves.

This novel blade treatment results in a new blade shape, and especially a modified tip section, that can be built into a new blade, regardless of its' material and process of manufacture, such as a fabricated steel blade or molded composite plastic blade, or cast into the shape of a cast metal blade. It could also be a separate additional element fastened onto an existing blade.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A rotor blade, oriented about an axis of rotation, defined by a length R, a chordwise dimension, a thickness dimension, and a plurality of cross-sectional areas that are perpendicular to a curve extending from the axis of a rotation to an ending point, each of said plurality of cross-sectional areas intersect said curve at a chosen reference point, wherein one of said plurality of cross-sectional areas having a minimal area is located at a selected point along length R with the remaining cross-sectional areas between said selected point and the ending point being modified by at least the thickness dimension of the rotor blade being increased.

2. The rotor blade of claim 1, wherein the cross-sectional area with minimal area is located at a point between 0.4R and 0.95R.

3. The rotor blade of claim 2, wherein the cross-sectional area with minimal area is located at approximately 0.8R.

4. The rotor blade of claim 1, wherein each of said plurality of cross-sectional areas share a common foil curve.

5. The rotor blade of claim 4, wherein common foil curve is a NACA type with a predetermined maximum chamber and a predetermined maximum chamber position.

6. The rotor blade of claim 1, wherein each cross-section is defined by a thickness dimension wherein said chosen reference point is a point where the thickness dimension is maximal.

7. The rotor blade of claim 6, wherein said curve is a straight line from axis of rotation to the ending point.

8. The rotor blade of claim 1, wherein said modification includes increasing both the thickness dimension and the chordwise dimension.

9. The rotor blade of claim 6, wherein said curve is defined as including a first curve from axis of rotation to the selected point and a second curve from selected point to the ending point.

10. The rotor blade of claim 9, wherein the second curve differs from the first.

11. The rotor blade of claim 9, wherein said first curve is a straight line and said second curve is not a straight line.

12. The rotor blade of claim 9, wherein both of said first and second curves are not a straight line.

13. The rotor blade of claim 1, wherein said cross-sectional areas between said selected point and the ending point where the blade terminates are modified by progressively increasing both the thickness and chordal dimensions thereof.

14. The rotor blade of claim 1, wherein said cross-sectional areas between said selected point and the ending point being modified are modified by increasing the area of a portion a said cross-sectional areas and decreasing the area of a portion of said cross-sectional areas.

15. A method for modifying an optimal rotor blade shape oriented about an axis of rotation, where the optimal rotor blade shape is defined by, a chordwise dimension, a thickness dimension, and a plurality of cross-sectional areas that are perpendicular to a curve extending from the axis of rotation to an ending point, each of said plurality of cross-sectional areas intersect said curve at a common reference point, comprising the steps of:

selecting a point along the curve; and modifying each cross-sectional area between that cross-sectional area located at the selected point and the cross-sectional area located at the ending point by increasing at least the thickness dimension of the blade.

16. The method of claim 15, wherein said modifying step further comprises: progressively increasing the thickness of said cross-sectional areas.

17. The method of claim 15, wherein said modifying step further comprises: modifying said curve from the selected point to the ending point where the blade terminates.

18. The method of claim 17, wherein modifying said curve from the selected point to the end point comprises aligning a leading edge of cross-sectional area with a leading edge of optimal blade.

19. An underwater turbine rotor blade oriented about an axis of rotation and defined by a length R, a chordwise dimension and a thickness dimension, said rotor blade having progressively enlarged foil shapes in at least the thickness dimension beginning at a point equal to about 0.4R and continuing there from to another point along length R.

20. The rotor blade of claim 19, wherein the progressively enlarged foil shape enlarges in both chordwise and thickness dimensions.

21. An underwater turbine rotor blade oriented about an axis of rotation and defined by a length R, a chordwise dimension, and a thickness dimension, said rotor blade having a modified foil shape beginning at a selected point along the length R and continuing from the selected point to an end point of said rotor blade with the modified foil shape being expanded at least in the thickness dimension.

22. The rotor blade of claim 21, wherein the endpoint corresponds to an outer tip on said rotor blade.

23. The rotor blade of claim 22, wherein the rotor blade terminates at the outer tip.

24. The method for modifying an optimal rotor blade shape oriented about an axis of rotation as in claim 15 further including the further modifying step of increasing both the thickness dimension and the chordwise dimension of the rotor blade.

* * * * *